United States Patent
Haak

(10) Patent No.: US 10,584,734 B2
(45) Date of Patent: Mar. 10, 2020

(54) METHOD FOR PRODUCING AN ADHESIVE SCREW CONNECTION USING A FLOW DRILL SCREW, AND COMPOSITE COMPONENT PRODUCED THEREBY

(71) Applicant: Bayerische Motoren Werke Aktiengesellschaft, Munich (DE)

(72) Inventor: Eugen Haak, Mooosburg an der Isar (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 210 days.

(21) Appl. No.: 15/259,217

(22) Filed: Sep. 8, 2016

(65) Prior Publication Data

US 2017/0058934 A1   Mar. 2, 2017

Related U.S. Application Data

(63) Continuation of application No. PCT/EP2015/053247, filed on Feb. 17, 2015.

(30) Foreign Application Priority Data

Mar. 10, 2014   (DE) ........................ 10 2014 204 292

(51) Int. Cl.
  *F16B 25/10*   (2006.01)
  *F16B 5/02*   (2006.01)
  (Continued)

(52) U.S. Cl.
  CPC .............. *F16B 25/106* (2013.01); *F16B 5/02* (2013.01); *F16B 11/006* (2013.01); *F16B 25/0021* (2013.01); *F16B 25/0031* (2013.01)

(58) Field of Classification Search
  CPC .......... F16B 5/02; F16B 5/0258; F16B 25/00; F16B 25/0015; F16B 25/0021;
  (Continued)

(56) References Cited

U.S. PATENT DOCUMENTS 4,273,983 A * 6/1981 Ogawa ................... B23K 11/04
                                                    219/107
5,094,579 A   3/1992 Johnson
(Continued)

FOREIGN PATENT DOCUMENTS

DE      39 09 725 C1     9/1990
DE      103 48 427 A1    5/2005
(Continued)

OTHER PUBLICATIONS

International Search Report (PCT/ISA/210) issued in PCT Application No. PCT/EP2015/053247 dated May 4, 2015, with English translation (five (5) pages).
(Continued)

*Primary Examiner* — Matthew P Travers
(74) *Attorney, Agent, or Firm* — Crowell & Moring LLP

(57) ABSTRACT

A method is provided for producing an adhesive screw connection between at least one upper component and at least one lower component using a flow drill screw, which penetrates the upper component at a joining point through a pre-drilled hole and is screwed together with the lower component, forming a flow-drilled hole. The pre-drilled hole in the upper component is covered by a secured cover which is first perforated by the flow drill screw before the latter penetrates into the pre-drilled hole and is then screwed together with the lower component.

14 Claims, 1 Drawing Sheet

(51) Int. Cl.
  *F16B 11/00* (2006.01)
  *F16B 25/00* (2006.01)

(58) Field of Classification Search
  CPC .... F16B 25/0031; F16B 25/10; F16B 25/103; F16B 25/106; F16B 43/00–43/001; B23P 11/00; Y10T 29/49963–49964
  See application file for complete search history.

(56) References Cited

U.S. PATENT DOCUMENTS

| | | | |
|---|---|---|---|
| 6,291,792 B1 * | 9/2001 | Fussnegger | B23K 11/20 219/118 |
| 2009/0278371 A1 | 11/2009 | Fuchs et al. | |
| 2010/0183404 A1 | 7/2010 | Draht et al. | |
| 2013/0195579 A1 * | 8/2013 | Freis | F16B 5/02 411/387.1 |
| 2014/0367452 A1 * | 12/2014 | Dinda | B23K 20/122 228/112.1 |

FOREIGN PATENT DOCUMENTS

| | | |
|---|---|---|
| DE | 10 2007 033 126 A1 | 1/2009 |
| DE | 10 2010 044 887 A1 | 5/2011 |
| DE | 10 2010 050 979 A1 | 6/2011 |
| DE | 10 2012 210 791 A1 | 1/2014 |
| EP | 2 423 518 A2 | 2/2012 |

OTHER PUBLICATIONS

German Search Report issued in counterpart German Application No. 10 2014 204 292.5 dated Feb. 12, 2015, with partial English translation (eleven (11) pages).

* cited by examiner

METHOD FOR PRODUCING AN ADHESIVE SCREW CONNECTION USING A FLOW DRILL SCREW, AND COMPOSITE COMPONENT PRODUCED THEREBY

CROSS REFERENCE TO RELATED APPLICATIONS

This application is a continuation of PCT International Application No. PCT/EP2015/053247, filed Feb. 17, 2015, which claims priority under 35 U.S.C. § 119 from German Patent Application No. 10 2014 204 292.5, filed Mar. 10, 2014, the entire disclosures of which are herein expressly incorporated by reference.

BACKGROUND AND SUMMARY OF THE INVENTION

The invention relates to a method for producing an adhesive screw connection between at least one upper component and at least one lower component using a flow drill screw.

The invention further relates to a composite component produced according to the invention, which, in particular, is a vehicle body part.

The production of an adhesive screw connection between components by bonding and flow drill screwing is sufficiently known from the prior art. In this respect, reference is made, for example, to German Patent document DE 103 48 427 A1. The process of the non-cutting hole- and thread-forming, as well as a suitable hole- and thread-forming or flow drill screw, are graphically illustrated in German Patent document DE 39 09 725 C1.

Particularly when the upper component has a material thickness and/or hardness unsuitable for flow drill screwing or is made of a material (such as FVK (fibrous composite material that is unsuitable for flow drill screwing, the upper component may have a pre-drilled hole, as illustrated in German Patent document DE 10 2012 210 791 A1. During the screw-in process, the screw tip and, subsequently, also the self-forming thread section of the flow drill screw, impact on the previously applied adhesive layer, causing the adhesive to be swirled up and escape out of the pre-drilled hole. This results in a dirtying of the screw-in device and/or of the components. Furthermore, the adhesive exiting from the pre-drilled hole impairs the torque control of the screw-in device. So far, the screw-in point has therefore been excluded from the application of adhesive. However, the adhesive-free section increases the expenditures for the application of adhesive and results in an interrupted bond seam.

It is an object of the invention to provide a method for producing an adhesive screw connection between at least one pre-drilled upper component and at least one lower component using a flow drill screw, which method does not have the disadvantage associated with the state of the art, or this disadvantage is at least reduced.

The method according to the invention for producing an adhesive screw connection between at least one pre-drilled upper component and at least one lower component using a flow drill screw, which penetrates or extends through the upper component at the joining point through a pre-drilled hole and is screwed together with the lower component while forming a flow hole, provides that the pre-drilled hole in the upper component is covered by a cover (fastened to the upper component) which is first perforated by the flow drill screw before the latter can penetrate into the pre-drilled hole and is subsequently screwed to the lower component.

The method according to the invention is preferably implemented in an automated manner. Several pre-drilled upper components and/or several lower components may be provided. The components are glued to one another on their mutually facing surfaces. The adhesive may be applied over an area or along at least one path (for generating a bond seam).

The cover covering the pre-drilled hole in the upper component prevents an exit of adhesive during the screw-in process. As a result, the components and the screw-in device (including the clamping tools used) cannot be dirtied by escaping adhesive. In addition, if provided, the torque control will remain stable. The application of the adhesive may take place continuously or over the entire surface, which simplifies the application, particularly the automated application, and advantages are also obtained with respect to the achieved strength of the connection and the corrosion behavior at the joining point. The cover also prevents a dirtying of the pre-drilled hole before the screw-in process. Other advantages are also associated with the invention.

A flow drill screw, i.e. a screw suitable for the non-cutting hole- and thread-forming, has a screw shaft with a hole-forming section and a self-forming thread section. The hole-forming section starts from the shaft tip or screw tip and the self-forming thread section adjoins it in the direction of the screw head.

It is preferably provided that the pre-drilled hole in the upper component is a through hole with a circular section. It is preferably provided that the cover covers the entire borehole edge of the pre-drilled hole and, for this purpose, preferably also has a circular design. However, the cover may also have a different shape or a different contour.

The diameter of the cover preferably depends on the diameter of the screw head of the flow drill screw used. In this case, it is particularly provided that the cover has a diameter that is by at least 2 mm larger (radially at least 1 mm) than the screw head of the flow drill screw used. This ensures that, despite the screw-in tolerance (particularly in the case of an automated screwing-in), the screw head does not protrude in the radial direction or project beyond the edge of the cover.

It may be provided, particularly while taking into account the screw head diameter, that the cover has a diameter that results in a radial protrusion of between 1 mm to 8 mm and particularly between 2 mm to 5 mm, with respect to the edge of the pre-drilled hole.

The cover is preferably made of a material that can be perforated in a non-cutting manner by the flow drill screw via contact pressure and rotation. The cover is preferably constructed of a sheet metal material and, particularly preferably, of a steel plate. It may especially be a stamped sheet metal part. The sheet metal material and particularly the steel plate preferably has a thickness of not more than 1.2 mm and particularly of only approximately 0.8 mm. During the perforation of the cover, a flow hole is preferably formed in the cover. The cover may be constructed with a through borehole.

The upper component is preferably made of metal, preferably of a sheet metal material and particularly of steel plate and, in particular, has a thickness (at the joining point) of more than 1.2 mm. The cover, particularly made of metal, can be glued to the upper component, the gluing-together taking place in the projecting area. The fastening of the cover may also take place by contact pressure, for which particularly the cut grade on a cover constructed as a stamped part can be utilized for an interlocking pressing-on or pressing-together with the upper component. It is preferably provided that the cover is welded onto the upper component or is fixed to the upper component by welding. The welding-together preferably takes place by projection welding or friction welding.

The upper component may also be made of a fiber-reinforced plastic material, for example, particularly of glass-fiber-reinforced plastic material (GFRP) or carbon-fiber-reinforced plastic material (CFRP). Analogously to the preceding explanations, the cover can be glued or pressed on.

The lower component is preferably constructed of a material suitable for forming a flow hole, particularly of a steel plate material or aluminum sheet material, having a material thickness or sheet thickness suitable for flow hole forming.

The fastening of the cover to the upper component has to be concluded at the latest before the start of the screwing process. The fastening of all covers preferably takes place immediately following the pre-drilling operation, in which case, this may also be carried out by the supplier.

A composite component according to the invention includes at least one pre-drilled upper component and at least one lower component. These components are joined in at least one joining point via an adhesive screw connection established according to the invention such that the screw shaft of the flow drill screw penetrates or extends through the upper component through a pre-drilled hole and is screwed into the lower component. The perforated cover acts as a washer for the screw head, for which the washer is permanently clamped in between the bottom side of the screw head and the exterior side of the upper component facing the screw head. The composite component particularly is a vehicle body part.

The cover originally intended for covering the upper pre-drilled hole in the top component therefore has a more extensive function as the head washer. The head washer or cover can therefore act as a sealing device, particularly also when the screw is set at a slant, in order to prevent the penetration of corrosive media into the pre-drilled hole and/or an under-head gap. In addition, the surface pressure exercised by the screw head upon the exterior side of the upper component can be reduced or equalized. The cover is preferably constructed of a softer material than the screw material and/or than the material of the upper component.

The composite component according to the invention may have several upper pre-drilled components and/or several lower components. The upper component and particularly also the lower component are preferably constructed in the form of a metal sheet.

Other objects, advantages and novel features of the present invention will become apparent from the following detailed description of one or more preferred embodiments when considered in conjunction with the accompanying drawing.

DETAILED DESCRIPTION OF THE DRAWINGS

In the following, the invention will be explained in detail as an example by means of a schematic FIGURE that is not drawn to scale. The characteristics illustrated in the FIGURE and/or explained in the following may be general characteristics of the invention, independently of concrete combinations of characteristics.

Three sectional representations (FIGS. 1A-1C) of a screw-in operation are shown.

Figure 1A:
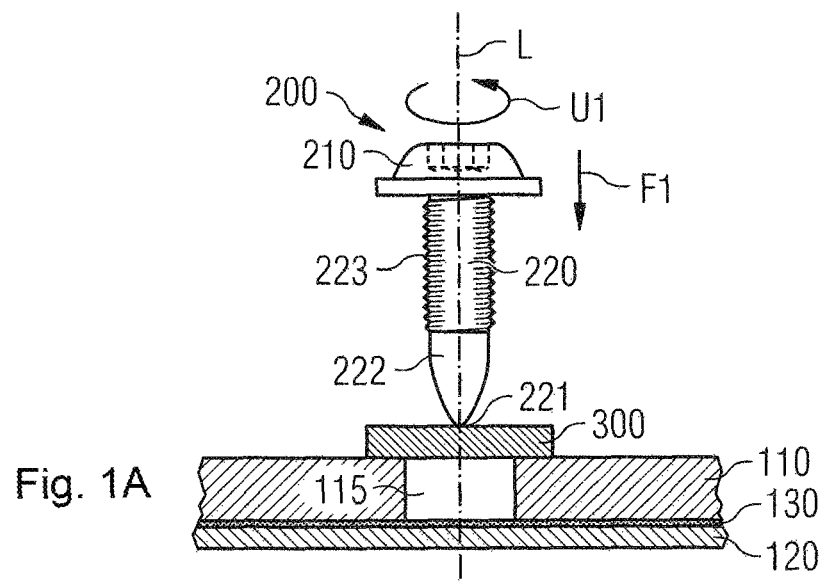
FIGS. 1A, 1B and 1C are sectional representations of a screw-in operation according to an embodiment of the invention

FIG. 1A is a detail view of two sheet-metal-type components 110 and 120 which are to be joined at the illustrated joining point by way of a flow drill screw 200. A continuous adhesive film or an intermediate adhesive layer 130 is situated between the components 110 and 120. The flow drill screw 200 has a screw head 210 and a screw shaft 220 that is molded to the latter and extends in the axial direction L (screw axis). The screw shaft 220 is constructed with a hole-forming section 222 starting out from the blunt or rounded tip 221 of the shaft or screw and with a self-forming thread section 223 adjoining in the direction of the screw head 210. As illustrated, the self-forming thread section 223 may extend to the screw head 210. Likewise, the shaft section that is close to the screw head 210 or adjoins the screw head 210 may be constructed without a thread or be threadless. As such, the flow drill screw 200 is known from the state of the art.

At the joining point, the upper component 110 has a pre-drilled hole 115 which, according to the invention, is covered by a cover (or small covering plate) 300 fastened to the upper component 110. The pre-drilled hole 115 is quasi-closed by the small plate-type cover 300. The cover 300 formed of a sheet metal material projects beyond the pre-drilled hole 115 in the radial direction and is glued or welded to the upper component 110 in this circular projection area so that no relative motions can be carried out between the cover 300 and the upper component 110. The radial projection of the cover 300 with respect to the borehole edge of the pre-drilled hole 115 amounts, for example, to 1 mm to 4 mm and, particularly, 2 mm to 3 mm, as explained above.

The screw-in operation implemented particularly in an automated manner is essentially divided into two phases. In the first phase, the cover 300 is perforated by the screw 200, and in the second phase, the screw is screwed into the lower component 120. This, in turn, takes place in two partial phases (flow hole forming and thread forming with a simultaneous thread engagement).

At the start of the screw-in operation, the flow hole forming screw 200 is pressed by means of a force F1 and a rotational speed U1 in an axial alignment with the pre-drilled hole 115 against the cover 300 (the screw-in device is not shown), whereupon the hole forming section 222 on the screw 200 forms a flow hole 305 in the cover 300 in a known manner and the cover is thereby perforated.

Deviating from the embodiment illustrated in FIG. 1A, the cover 300 may already be constructed with a through hole, which is widened by the hole forming section 222 of the screw 200. For this purpose, the, in particular, concentrically designed through hole has a smaller diameter then the nomimal diameter of the screw 200.

Figure 1B:
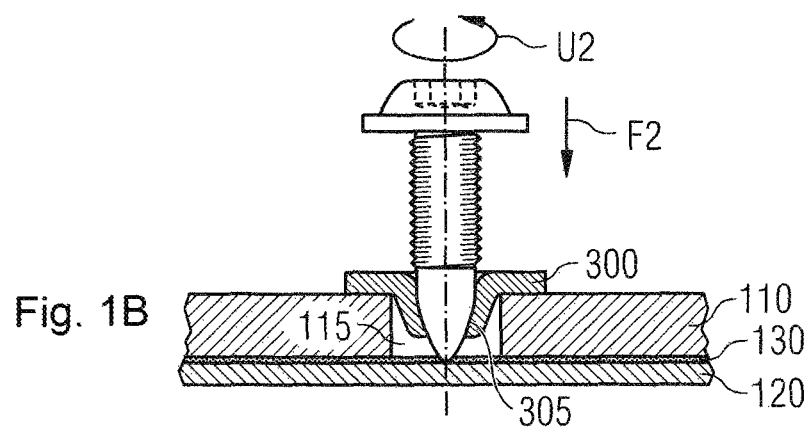

During the further screw-in operation, the screw tip 221 now situated in the pre-drilled hole 115 will impact on the bottom component 120, as illustrated in FIG. 1B, and will be pressed against the lower component at a rotational speed U2 and a force F2, whereby in a known manner a flow hole 125 is formed in the lower component 120. Into this flow hole 125, the self-forming thread section 223 of the screw 200 will be screwed. In the meantime, the cover 300 closes the pre-drilled hole 115 in the upper component 110 and prevents that swirled-up adhesive 130 or adhesive transported upwards by the screw thread 123 from escaping out of the pre-drilled hole 115. Furthermore, during this second phase of the screw-in operation, the screw 200 is centered within the pre-drilled hole 115 by the flow hole 305 formed in the cover 300, and contact between the screw shaft 220 and the interior wall of the pre-drilled hole 115 is prevented.

During the entire screw-in operation, the axial pressure force F or the rotational speed U can be varied and, in particular, can be controlled. A reversal of the rotating direction may also be provided. In addition, a clamping device or the like may be used for applying a fixing force to the upper component 110.

Figure 1C:
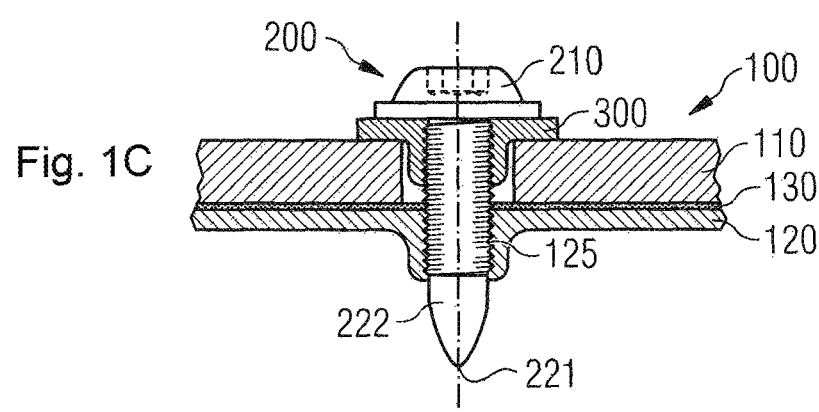

After the screw-in operation, the upper component 110 facing the screw head 210 will be fixed by an interlocking clamping between the screw head 210 and the lower component 120 facing away from the screw head 210. The upper component 110 may therefore also be called as clamping part. This is illustrated in FIG. 1C. The screw head 210 has a larger diameter than the pre-drilled hole 115 in the upper component 110 (facing the screw head 210) so that, as intended, the pre-drilled hole 115 will be completely covered by the screw head 210. The cover 300 situated between the screw head 210 and the upper component 110, in turn, has a larger diameter than the screw head 210, as mentioned above.

As further illustrated in FIG. 1C, the cover 300 deformed by the flow hole forming or its continuation projecting into the pre-drilled hole 115 may cause an interlocking in the radial direction between the screw shaft 220 and the upper component 110 (not shown), whereby shearing stress between the components 110 and 120, particularly before the hardening of the adhesive 130, can be better tolerated, without any slipping out of position of the components with respect to one another.

The adhesive of the adhesive layer 130 between the components 110 and 120 can subsequently be hardened, for example, in a KTL (cathodic dip painting process). The perforated cover 300 remains as the head washer and, in the following, can be used for sealing off the pre-drilled hole 115.

Deviating from the above-mentioned illustration, in which the cover or the head washer 300 protrudes in the radial direction beyond the screw head 210 (i.e. the cover 300 has a larger diameter than the screw head 210), the cover or the head washer 300, as a result of a corresponding coordination of the cover diameter, may correspond in the radial direction with the screw head 210 or may be radially set back.

The component composite 100 illustrated as a detail in FIG. 1C has an upper component 110 and a lower component 120, the components 110 and 120 being glued together by way of an intermediate adhesive layer 130 and, at the illustrated joining point, also being joined by a flow drill screw 200 such that the screw shaft 220 projects through or penetrates the upper component 110 through the pre-drilled hole 115 and is screwed to the lower component 120 through the intermediate adhesive layer 130. The perforated cover 300, which was originally provided for covering the pre-drilled hole 115 in the upper component 110, is now used as a washer for the screw head 210. The mutually joined components 110 and 120 may be constructed of various materials (so-called mixed construction).

LIST OF REFERENCE SYMBOLS

100 Component composite
110 Upper component
115 Pre-drilled hole
120 Lower component
125 Flow hole
130 Adhesive, adhesive layer
200 Flow drill screw
210 Screw head
220 Screw shaft
221 Screw tip, shaft tip
222 Hole forming section
223 Self-forming thread section
300 Cover
305 Flow hole
F Axial pressure force
L Longitudinal axis, screw axis
U Rotational speed The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing an adhesive screw connection between an upper component and a lower component using a flow drill screw that penetrates the upper component at a joining point through a pre-drilled hole in the upper component and is screwed together with the lower component while forming a flow-drilled hole, the method comprising the acts of:
    covering the pre-drilled hole in the upper component via a fastened cover; and
    first perforating the fastened cover by the flow drill screw before the flow drill screw penetrates into the pre-drilled hole and is then screwed to the lower component, wherein
        after the flow drill screw is screwed to the lower component, the cover does not contact the lower component, and an open space exists within the pre-drilled hole between the cover and the lower component.

2. The method according to claim 1, wherein the cover has a diameter at least two millimeters larger than a screw head of the flow drill screw.

3. The method according to claim 1, wherein the cover is formed of sheet metal material having a sheet metal thickness of no more than 1.2 mm.

4. The method according to claim 3, wherein the cover is a stamped sheet metal part.

5. The method according to claim 1, wherein the upper component is made of metal.

6. The method according to claim 5, wherein the upper component has a thickness of no more than 1.2 mm.

7. The method according to claim 6, wherein the upper component is a steel plate.

8. The method according to claim 5, wherein the act of covering the pre-drilled hole comprises welding the cover together with the upper component.

9. The method according to claim 8, wherein the act of welding is carried out via projection welding or friction welding.

10. The method according to claim 1, wherein the upper component is a fiber reinforced plastic material component.

11. The method according to claim 10, wherein the act of covering the pre-drilled hole comprises gluing or pressing the cover onto the fiber reinforced plastic material component.

12. The method according to claim 1, wherein the act of covering the pre-drilled hole comprises gluing or pressing the cover onto the upper component.

13. The method according to claim 1, further comprising the acts of:
   pre-drilling one or more holes in the upper component; and
   immediately following the pre-drilling, performing the act of covering the one or more holes in the upper component by the fastened cover.

14. The method according to claim 1, wherein the fastened cover is in no contact with the lower component even after the first perforating of the fastened cover.

* * * * *